United States Patent
Giovannini et al.

(10) Patent No.: US 7,985,036 B2
(45) Date of Patent: Jul. 26, 2011

(54) PROCESS, SYSTEM AND EQUIPMENT FOR THE TOWING OF UNDERWATER PIPELINES

(75) Inventors: Umberto Giovannini, Corsico-Milano (IT); Antonio Passerini, Pavia (IT); Valerio Bregonzio, Varese (IT)

(73) Assignee: SAIPEM S.p.A., San Donato Milanese-Milan (IT)

(*) Notice: Subject to any disclaimer, the term of this patent is extended or adjusted under 35 U.S.C. 154(b) by 126 days.

(21) Appl. No.: 11/577,032

(22) PCT Filed: Jul. 14, 2005

(86) PCT No.: PCT/EP2005/007724
§ 371 (c)(1),
(2), (4) Date: Apr. 11, 2007

(87) PCT Pub. No.: WO2006/045357
PCT Pub. Date: May 4, 2006

(65) Prior Publication Data
US 2008/0095583 A1    Apr. 24, 2008

(30) Foreign Application Priority Data
Oct. 25, 2004  (IT) .............................. MI2004A2021

(51) Int. Cl.
*F16L 1/12* (2006.01)

(52) U.S. Cl. ......... 405/171; 405/158; 405/184; 441/133

(58) Field of Classification Search ............... 405/154.1, 405/158, 162, 171, 173, 184, 200; 441/133; 248/88
See application file for complete search history.

(56) References Cited

U.S. PATENT DOCUMENTS

| | | | |
|---|---|---|---|
| 3,727,417 A * | 4/1973 | Shaw | 405/171 |
| 4,011,729 A | 3/1977 | Kermel | |
| 4,037,425 A | 7/1977 | Berg | |
| 4,107,933 A | 8/1978 | Lamy | |
| 4,121,529 A | 10/1978 | Smith et al. | |
| 4,138,853 A | 2/1979 | Lamy | |
| 4,183,697 A * | 1/1980 | Lamy | 405/170 |

FOREIGN PATENT DOCUMENTS
GB    1 434 357    5/1976
* cited by examiner

*Primary Examiner* — David J Bagnell
*Assistant Examiner* — Benjamin Fiorello
(74) *Attorney, Agent, or Firm* — Oblon, Spivak, McClelland, Maier & Neustadt, L.L.P.

(57) ABSTRACT

Process for the towing of underwater pipelines by means of head tugs for the pulling and tail tugs for the counter-pulling characterized in that it is effected by the use of a set of equipment, connected to the pipeline itself, including floats, of which at least a part has a variable buoyancy or partially variable buoyancy, which, when placed in a pre-established position and at pre-established intervals, provide a graded buoyancy to the pipeline in relation to the distance from the bed so as to obtain a "festoon" configuration of the pipeline, i.e. with suspended sections of pipeline, in correspondence with the floats, alternating with resting sections.

10 Claims, 3 Drawing Sheets

PROCESS, SYSTEM AND EQUIPMENT FOR THE TOWING OF UNDERWATER PIPELINES

BACKGROUND

The present invention relates to a process, a system and equipment for the towing of underwater pipelines.

The use of methods and relative equipment for the formation of sections of underwater pipelines by the towing of prefabricated "strings" of pipe from the production site to the final destination, is known in the oil industry. Among the various possible methods, the so-called "off-bottom tow" is considered as being the most widely-used. The pipeline is towed by conveying it slightly above the seabed. Specific floats are arranged along the pipeline to guarantee a slightly positive buoyancy whereas segments of chain are arranged in correspondence with the floats, as described, for example, in U.S. Pat. No. 4,011,729. The chain allows the buoyancy to be compensated in relation to the length of suspended section and the pipe therefore has a neutral layout. Thanks to the length of chain, uncertainties with respect to the weight in water of the pipe can be compensated and consequently the buoyancy of the floats. As the pipe does not drag along the seabed, there is no resistance to its advancing. This is due only to the section of chain resting on the seabed (of a length which cannot be accurately defined a priori). Although this method is used, it has various drawbacks among which the fact that, in the presence of transversal currents, the pipe can be shifted off course due to the limited transversal resistance offered by the chains. This problem has been faced, for example in U.S. Pat. No. 4,107,933 and U.S. Pat. No. 4,138,853, by proposing the use of various lay-outs of the chains and/or mechanical drifts to increase the transversal rigidity. In other cases however, it is the very presence of the chains which is not acceptable (excessive uncertainty as to the effective weight of the pipeline, excessive friction of the chains on the seabed, extremely long strings with the result that the sections of dragging chains create actual furrows on the seabed). An alternative technique consists in keeping the pipe in a semi-submersed position, i.e. directly resting on the seabed but with a lightened weight. In this case, controlled buoyancy floats can be used: for example, U.S. Pat. No. 4,121,529 describes an inflatable float capable of maintaining a constant buoyancy according to the depth, i.e. with the possibility of varying it as required again with reference to the depth. A combination of fixed and mobile buoyancy inflatable floats can be used.

SUMMARY

The uncertainties as to the weight of the pipeline and with respect to the nature and configuration of the seabed make it difficult to accurately establish a priori the characteristics of the equipment to be used (floats and chains) and the behaviour during the towing (excessive resistance to longitudinal pulling, insufficient lateral resistance). It is difficult to control the equipment (buoyancy of the variable floats, resistance of the drifts) for extremely long strings (various km), due to the variability of the surrounding conditions.

The solution we propose to the problems of the known art is based on a geometric control of the configuration of the pipeline with respect to the seabed and not to the depth.

The process for the towing of underwater pipelines, object of the present invention, by means of head tugs for the pulling and tail tugs for the counter-pulling, is characterized in that it is essentially effected with the use of a set of equipment, connected to the pipeline itself, substantially containing floats, of which at least a part has a variable buoyancy or partially variable buoyancy, which, when placed in a pre-established position and at pre-established intervals, provide a graded buoyancy to the pipeline in relation to the distance from the bed so as to obtain a "festoon" configuration of the pipeline, i.e. with suspended sections of pipeline, in correspondence with the floats, alternating with resting sections.

The pulling operation is facilitated by a double effect, static with the weight reduction of the pipeline (for the buoyancy of the float) and geometric (festooning, which leads to a sequential mobilization of the friction). The longitudinal and transversal friction are of the same order of magnitude and consequently the pipeline is transversally stable.

More specifically, the process according to one aspect of the invention includes the generation of at least partially variable buoyancies with an ascending and descending effect in a vertical direction in pre-established points of the pipeline by means of the set of equipment, connected to the pipeline itself, each substantially consisting of a variable or partially variable buoyancy float, whose lower base is at least partially open to act as an air "bell", having a nozzle for feeding the air, a suitable actuator consisting of a pipe or sections of pipe which provides a communication between the inside and outside of the float, for the air discharge, with a fixed outlet mouth and an inlet mouth, positioned inside the float, the buoyancies being effected by the swings of the single inlet mouths, activated by a mechanism which moves them according to the distance of the pipeline from the seabed, so that the mouths rise when the distance increases whereas they descend when the distance decreases, thus obtaining the desired "festoon" configuration of the pipeline, and pulling of the pipeline to be towed, in a longitudinal direction, by means of at least one head tug connected thereto and counter-pulling by means of another tail tug connected thereto.

Chains are not used with this process, but it is the pipeline itself which is in direct contact with the ground.

The control is purely geometric: a threshold height is pre-established, under which the buoyancy of the float is automatically increased and above which it is reduced. The threshold height is pre-established with structural calculations to allow the buoyancy variation system, with reference to the longitudinal pulling limit, to be set up. This threshold value does not have to be accurately calculated but it is sufficient to identify its order of magnitude and a reference datum.

The desired festooning effect has the following advantages: it allows the pipe to be kept partially in contact with the seabed, improving its lateral stability and it reduces the pull necessary for the longitudinal movement thanks to a progressive mobilization effect of the friction as, before moving as a result of the pull in a longitudinal direction, the various spans of the piping will undergo an oscillation in a vertical direction allowing the progressive detachment of the sections of pipe resting on the seabed, whose friction with the seabed will pass from the static friction conditions of the first detachment to the much more favourable conditions (lesser) of dynamic friction without moving the whole length of the pipe as in the case of a non-festooned configuration. Although the control of the buoyancy variation can remain active during the pulling, once the desired configuration has been statically obtained, the buoyancy variability will be automatically deactivated.

A further object of the invention relates to a system for towing underwater pipelines which includes at least one head tug, connected to the pipeline by means of a pulling head, for its pulling; at least one tail tug, connected to the pipeline by means of a pulling head, for its counter-pulling; a set of equipment, connected to the pipeline itself, substantially consisting of a variable or partially variable buoyancy float, whose lower base is at least partially open to act as an air "bell", having a nozzle for feeding the air, a suitable actuator consisting of a pipe or sections of pipe which provides a communication between the inside and outside of the float, for the air discharge, with a fixed outlet mouth and an inlet mouth, positioned inside the float, the inlet mouth being activated by a mechanism which moves it according to the distance of the pipeline from the bottom; an air compressor on board the head or tail tug or boat; possibly further fixed buoyancy floats.

A further object of the invention relates to equipment (A) which can be used in the process or in the system for the towing of underwater pipelines described above, which includes a float (G), in the form of a prism with a horizontal or vertical axis, with a variable or partially variable buoyancy, whose lower base is at least partially open to act as an air "bell", having: at least one nozzle (U) whereby air is fed; a suitable actuator (B) consisting of a pipe or sections of pipe forming a communication between the inside and outside of the float (G), for the air discharge, having a fixed outlet mouth ($B_u$) and an inlet mouth ($B_i$), positioned inside the float, with a variable height swing from a pre-established minimum position to a pre-established maximum position; means for connecting the equipment to the pipeline; means for transferring air to the float; means for activating and/or positioning the inlet mouth in relation to the distance of the pipe itself from the bottom.

The floats, which can be made of a metallic, plastic and/or composite material, are preferably filled with compressed air at environment pressure.

As the float is at least partially open in the lower part for acting as an air "bell", its shell and structure are only suitable for resisting a small overpressure with respect to the seabed.

This means that the buoyancy is guaranteed by an inner air volume which excludes the water. The float is naturally structurally conceived for transmitting the buoyancy to the pipeline to which it is connected by means of cables or belts or other connections. The structure of the float in itself and the means of connecting it (and rapidly disconnecting it) are those normally used for fixed buoyancy floats.

Although the activation of the mouth as also the measurement of the distance from the seabed can be effected in various ways and, with electronic instruments, with great accuracy, it is preferable to use a mechanical-type activation, in particular by means of simple leverages which connect the bottom with the mouth.

In an alternative embodiment, the leverage can be blocked when it reaches the threshold, so that the pulling operations take place under definite conditions.

A further alternative embodiment envisages a further air nozzle, with a greater opening than the previous one, which is activated by the same mechanism under the sole condition of the float in a descending movement to have a greater air flow.

In another embodiment, the two nozzles are integrated in a single nozzle with a variable passage (fixed for maintenance and with a large opening for a rapid intervention).

With respect to the height variation of the inlet mouth, this can be obtained, for example, with telescopic pipes or with a flexible pipe by exploiting its overlength to allow the swing.

On the top of the float, there can optionally be discharge valves activated for rapid emptying, which are also known.

The air feeding is guaranteed by a connection to one or more compressed air hoses connected to a surface compressor.

As mentioned above, the float has a regulation of the discharge level of the internally entrapped air linked to the distance from the seabed: for safety purposes, the air feeding is continuous (or high frequency intermittent) and takes place by means of a preferably small passage nozzle; an air discharge effected by means of a piping whose mouth is positioned inside the case formed by the float at a certain level, evacuates the excess air and thus establishes the effective volume of remaining air and consequently the effective buoyancy of the float.

The range of this mouth can cover the height of the float (which will therefore be of the variable buoyancy type) or only a part (lower) of the height, and consequently the float will have a partially variable buoyancy. The mouth is activated by a mechanism which moves it in accordance with the distance from the seabed (it rises as the float moves away from the seabed and descends as the latter moves nearer the seabed). The regulation is more preferably effected at a certain distance threshold, over which the mouth is raised to reduce the buoyancy or, in inverse movement, up to which the mouth descends to increase the buoyancy. The effect is that when the span height (festooning) increases under the float, this tends to reduce the buoyancy and vice versa. This guarantees festooning and, in terms of safety, it ensures that the pipeline never reaches the waterline.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. In particular, an embodiment of the present invention is described hereunder with the help of FIGS. 1, 2 and 3, in which.

DETAILED DESCRIPTION

Figure 1:
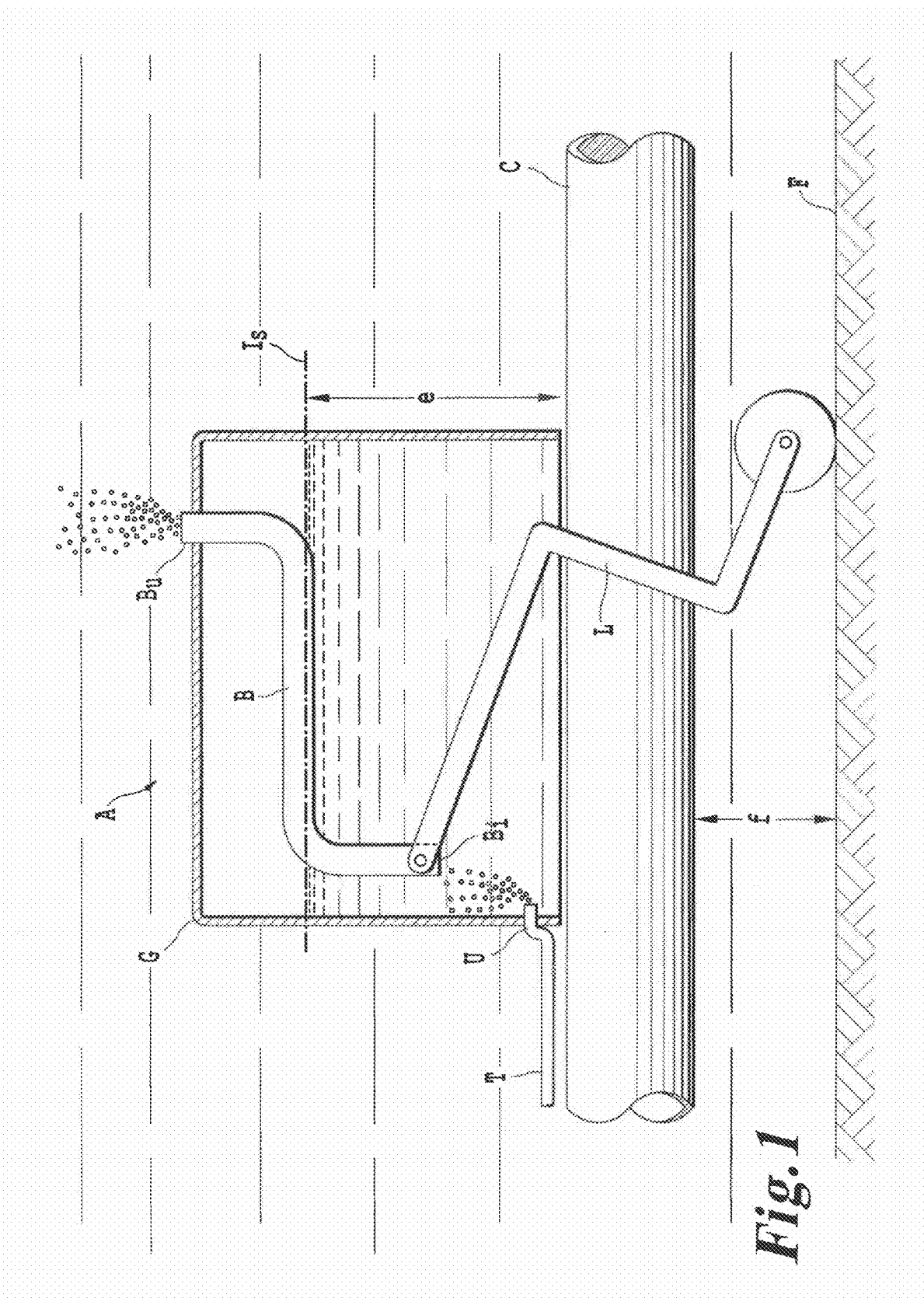
FIG. 1 shows equipment according to one aspect of the claimed invention.

FIG. 1 represents the equipment (A) in accordance with the invention connected to the pipeline (C) in which f (height) is the distance of the pipeline (C) from the seabed (F).

The equipment (A) includes:

the prismatic float (G), at least partially open below, a piping (T), connected to a compressor, to fill the float with air through a nozzle (U), a pipe (B) for the air discharge, equipped with an inlet mouth ($B_i$) and an outlet mouth ($B_u$), an actuation leverage (L) of the inlet mouth.

The fixed buoyancy level ($l_s$) and variable buoyancy swing (e) are also represented.

Figure 2:
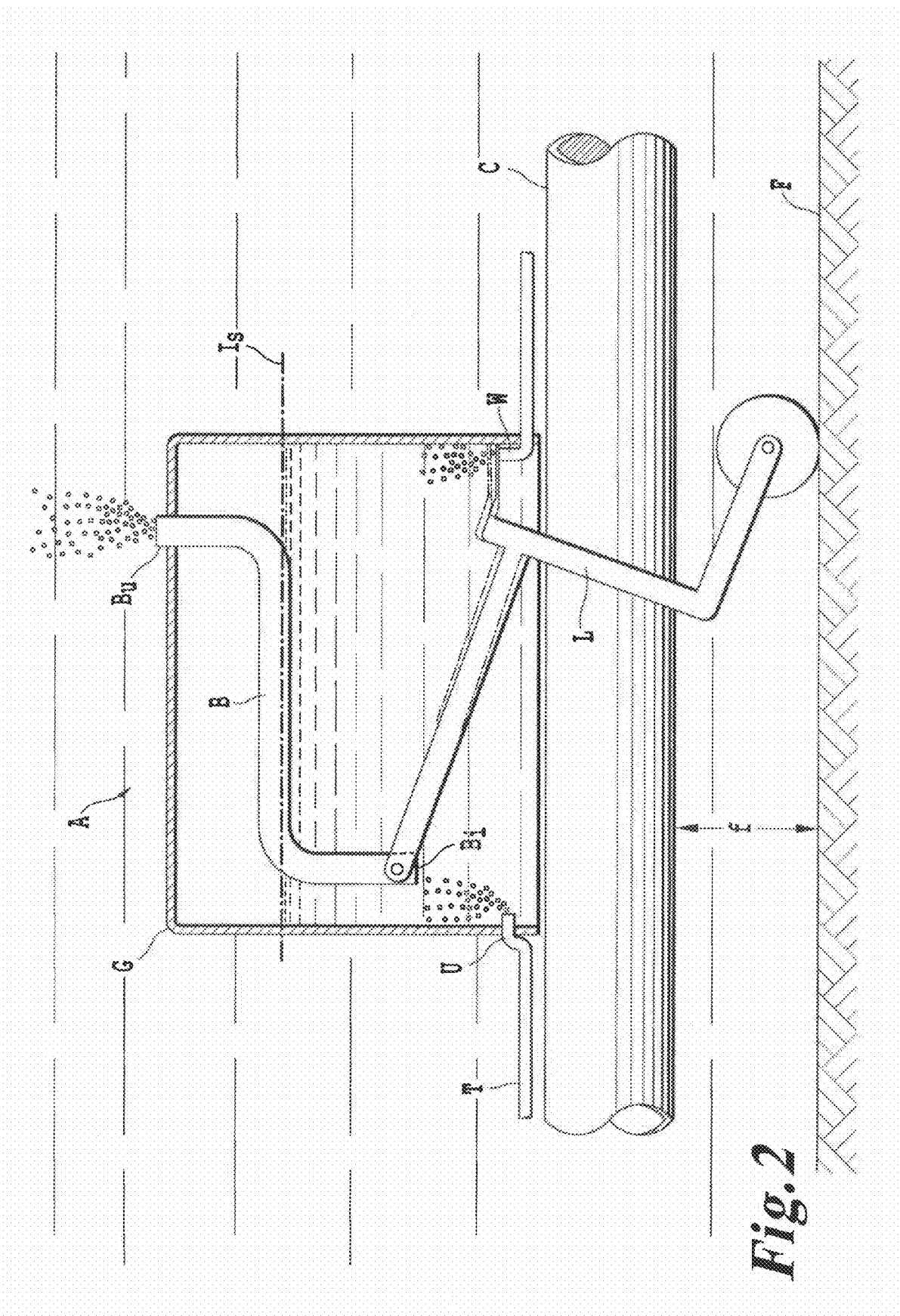
FIG. 2 shows the equipment of FIG. 1 including a further air nozzle.

FIG. 2 indicates the equipment (A) of FIG. 1 which also has a further air nozzle (W) which is activated by the same mechanism (L) under the sole condition of the float in a descending movement.

Figure 3:
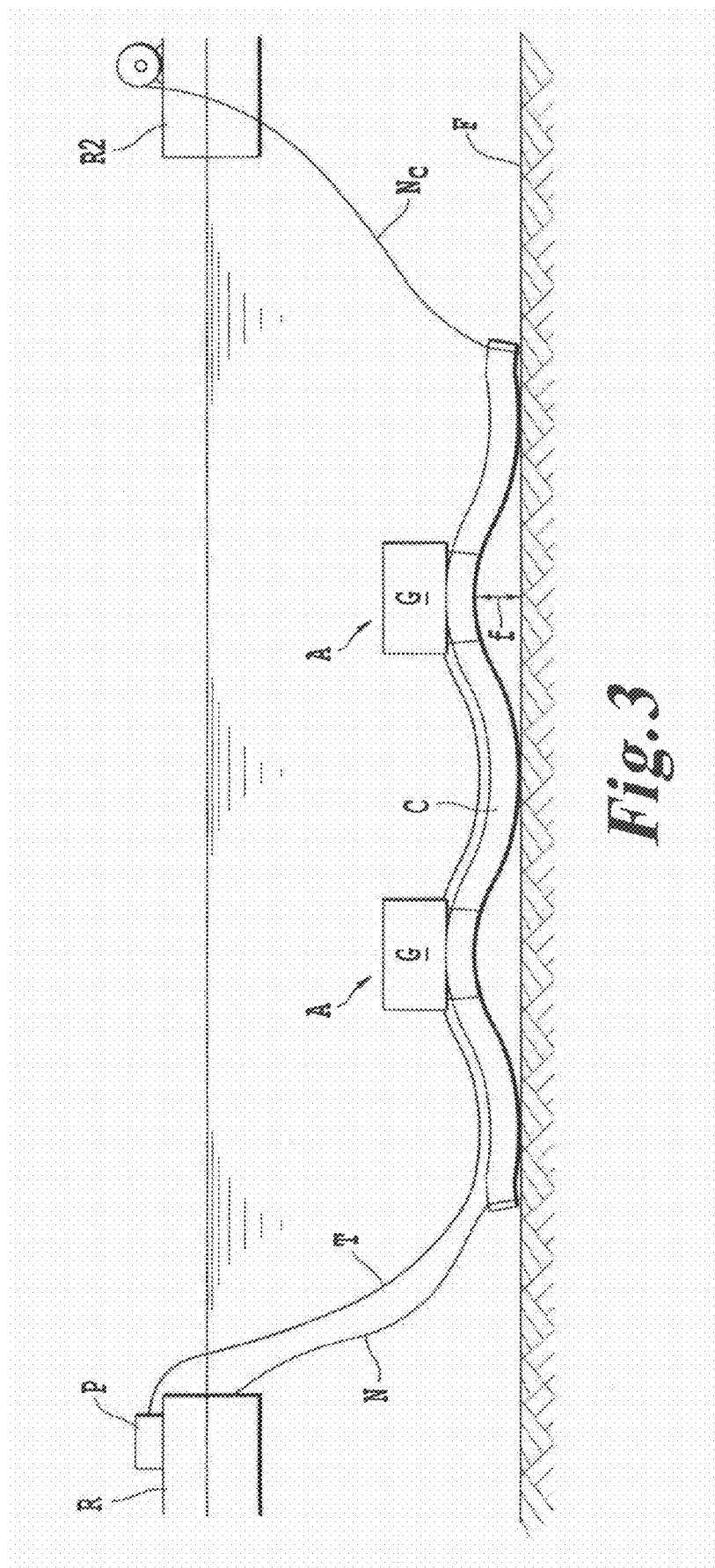
FIG. 3 is a schematic diagram of a system according to one aspect of the claimed invention.

FIG. 3 schematizes the system according to the invention.

The head tug R pulls the pipeline (C) by means of the towing cable (N). The various pieces of equipment (A) are connected to the pipeline in certain points in accordance with the invention, which are filled with air thanks to the compressor (P) installed in the head tug (R). (f) again indicates the festooning height, i.e. the distance from the seabed (F) of a certain point of the piping to which the equipment is applied.

An example is now provided for a better illustration of the invention.

A particularly long steel pipe is considered, having a length of several kilometers, for example 10 km long, with a certain diameter, for example 14" and a certain thickness, for example 14 mm. The pipeline is already resting on the seabed following a previous prefabrication and laying operation and this piping must be transferred to another definite site. The pipeline has a concrete coating to weigh it down in order to stabilize it in the final site. It has a certain net weight in the water, for example 250 kg/m. A certain friction coefficient is considered with the seabed, for example having a value 1. A certain weight tolerance due to various uncertainties (steel thickness, concrete thickness, concrete composition, absorption), is considered, for example ±4%, with a consequent variability of ±10 kg/m. To allow pulling with the tugs at acceptable levels, it is preferable to operate below a certain threshold, for example 200 tons. The result is, in the case proposed herein, that there must be an equivalent linear weight, with respect to 10 km, and with a friction 1, of 20 kg/m, lightening the pipe with an equivalent buoyancy of 230 kg/m. The problem arises as a result of the weight tolerance in water, not definable a priori, which causes an oscillation of the effective linear weight from 10 kg/m to 30 kg/m. In the first case, there is the danger of coming too close to a neutral pipe or even floating condition, compromising the lateral stability of the pipeline, however, as a result of the transversal currents. In the second case, there is the risk of not succeeding in pulling the pipe string into its final position due to the excessive pull required.

Floats are arranged in the pipeline according to the invention, of the type schematized in FIG. 1, with a buoyancy of about 11 tons at a distance of 48 m to obtain a festooning in the order of tens of centimeters of height and the threshold can be correspondingly fixed at 20 cm. The variability of the buoyancy in this case can be ±2000 kg.

This buoyancy variability is obtained by filling the floats with air, by introducing or discharging air which is supplied by one or more suitable pipes connected with a compressor on board of a tug or boat.

A head tug is envisaged, which pulls the pipeline and is connected thereto, as well as with the pulling cable, also with pipes for bringing air to the floats (typically two for safety reasons), the pipeline itself (equipped with a pulling head) on which the variable buoyancy floats with air are installed, possibly fixed buoyancy floats (with or without air), a tail tug for the counter-pulling, connected to the pipeline (with a further pulling head) and also possibly connected to the air pipes and optionally equipped with a compressor.

The invention claimed is:

1. A method of towing an underwater pipeline by head tugs for pulling and tail tugs for counter-pulling, the method comprising:
    connecting a set of equipment to the pipeline itself, the equipment including floats, at least a float of the floats has an at least partially variable buoyancy, the floats placed in pre-established positions and at pre-established intervals to provide a graded buoyancy to the pipeline based on a distance from a seabed so as to obtain a festoon configuration of the pipeline by providing suspended sections of the pipeline, in correspondence with the floats, alternating with resting sections of the pipeline; and
    adjusting the graded buoyancy provided to the pipeline based on the distance from the seabed, including establishing a threshold height, measured from the seabed, of said float having an at least partially variable buoyancy and maintaining the threshold height by automatically adjusting the buoyancy of said float in response to the distance of the pipe from the seabed.

2. The method of towing the underwater pipeline according to claim 1, further comprising:
    generating, in said adjusting the graded buoyancy, at least partially variable buoyancies with an ascending and descending effect in a vertical direction in pre-established points of the pipeline by the set of equipment connected to the pipeline itself, each pre-established point including said float having an at least partially variable buoyancy, said float including a lower base which is at least partially open to act as an air bell, a nozzle for feeding air, an actuator including a pipe which provides a communication between an inside and outside of said float, for air discharge, with a fixed outlet mouth and a single inlet mouth, positioned inside said float, said buoyancy of said float being effected by swings of the single inlet mouth, activated by a mechanism which moves said mouth according to the distance of said pipeline from the seabed, so that said mouth rises when said distance increases whereas said mouth descends when said distance decreases, thus obtaining the festoon configuration of the pipeline; and
    pulling the pipeline in a longitudinal direction by at least one head tug connected thereto and counter-pulling by another tail tug connected thereto.

3. The method according to claim 2, wherein said mechanism is a leverage which moves according to the distance of said pipeline from the seabed by coupling the seabed to said inlet mouth.

4. A system for towing an underwater pipeline comprising:
    at least one head tug, connected to said pipeline by a pulling head, for pulling the pipeline;
    at least one tail tug, connected to said pipeline by a pulling head, for counter-pulling the pipeline;
    a set of equipment, connected to the pipeline itself, including an at least partially variable buoyancy float, said float including a lower base which is at least partially open to act as an air bell, a nozzle for feeding air, an actuator including pipe which provides a communication between an inside and outside of said float, for air discharge, with a fixed outlet mouth and an inlet mouth, positioned inside said float, said inlet mouth being activated by a mechanism which moves according to a distance of said pipeline from a seabed; and
    an air compressor on board the at least one head tug, the at least one tail tug, or a boat, wherein
    the equipment maintains a threshold height of said float, measured from the seabed, by automatically adjusting said buoyancy of said float in response to the distance of the pipe from the seabed.

5. The system according to claim 4, wherein said mechanism is a leverage which moves according to the distance of said pipeline from the seabed by coupling the seabed to said inlet mouth.

6. Equipment for towing an underwater pipeline comprising:
    a float, in the form of a prism with a horizontal or vertical axis, with an at least partially variable buoyancy, said float including a lower base which is at least partially open to act as an air bell, including:
        at least one nozzle whereby air is fed, and
        an actuator including a pipe forming a communication between an inside and outside of said float, for air discharge, a fixed outlet mouth and an inlet mouth, positioned inside said float, with a variable height swing from a pre-established minimum position to a pre-established maximum position;

means for connecting said equipment to the pipeline;

means for transferring air to said float; and means for activating and/or positioning said inlet mouth, based on a distance of the pipe itself from a seabed, for maintaining said float at a threshold height, measured from the seabed, by automatically adjusting said buoyancy of said float in response to the distance of the pipe from the seabed.

7. The equipment according to claim 6, wherein the means for activating the inlet mouth are of a mechanical type.

8. The equipment according to claim 7, wherein the means of the mechanical type for activating the inlet mouth is a leverage which couples the seabed to the inlet mouth.

9. The equipment according to claim 6, wherein the float is made of a metallic, plastic and/or composite material.

10. The equipment according to claim 6, said float including an additional nozzle for feeding air, activated under sole condition of the float in a descending movement.

* * * * *